Dec. 25, 1934.   O. A. ROSS   1,985,552
SOUND MOTION PICTURE PROJECTION APPARATUS
Filed Sept. 18, 1928   2 Sheets-Sheet 1
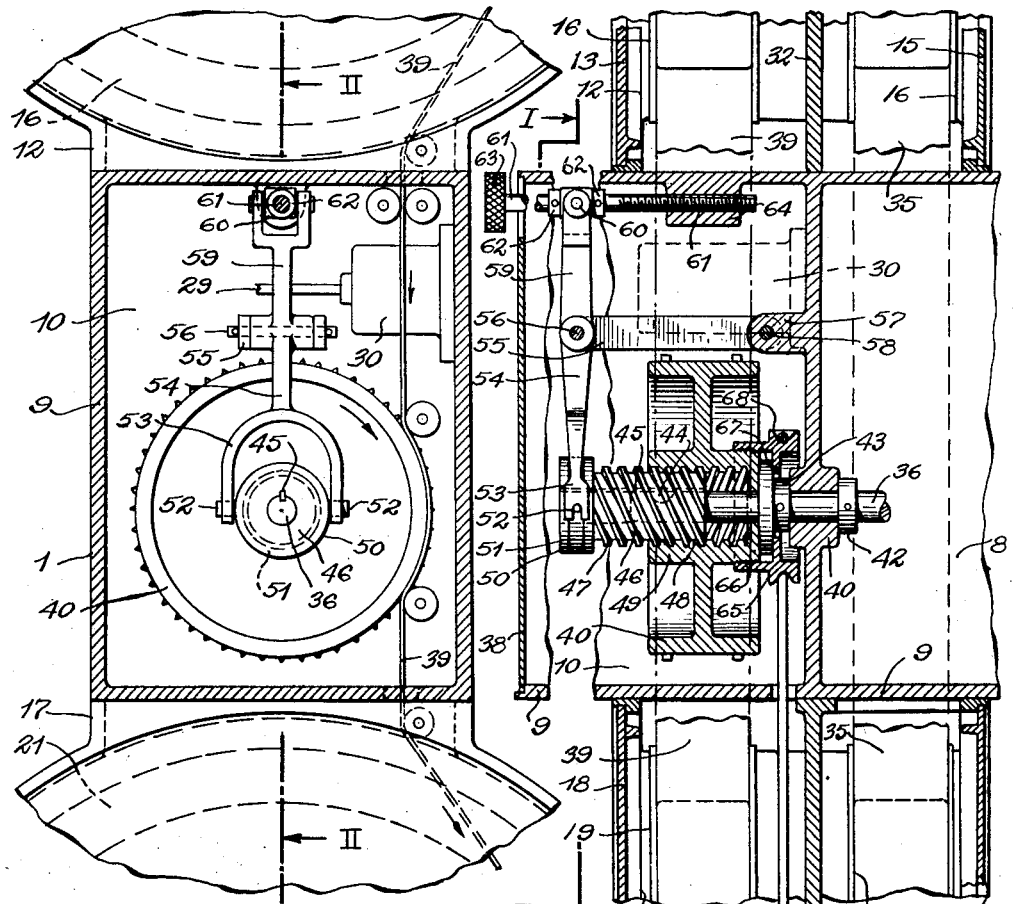
INVENTOR
Oscar A. Ross Dec. 25, 1934.   O. A. ROSS   1,985,552
SOUND MOTION PICTURE PROJECTION APPARATUS
Filed Sept. 18, 1923   2 Sheets-Sheet 2
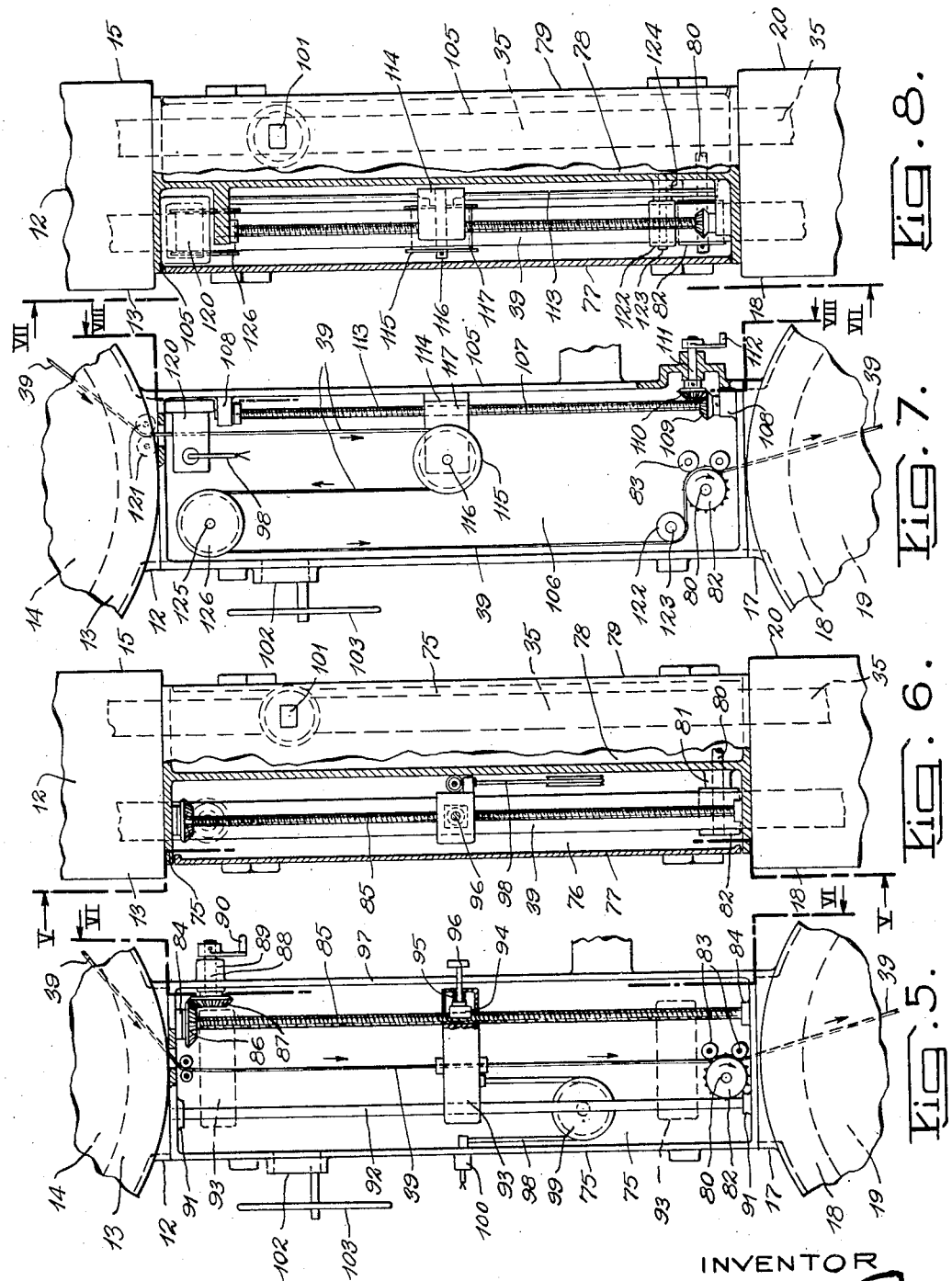
INVENTOR
Oscar A. Ross.

Patented Dec. 25, 1934

1,985,552

UNITED STATES PATENT OFFICE 1,985,552

SOUND MOTION PICTURE PROJECTION APPARATUS

Oscar A. Ross, New York, N. Y.

Application September 18, 1928, Serial No. 306,656

22 Claims. (Cl. 88—16.2)

This invention refers to apparatus for simultaneously exhibiting recorded sound and action and more particularly to that class known as apparatus for presentation of what is more generally known as "talking movies".

One object of this invention is to furnish a novel form of apparatus for simultaneously advancing separated sound record and action record films whereby, as exhibition of the action occurs on the screen, presentation of the accompanying sound record will be more accurately synchronized therewith by the loud speakers presenting the accompanying sound.

Another object is to furnish apparatus wherein separated sound and action films will be advanced thereby, said apparatus providing novel means for framing, or synchronizing the sound record with the action record while the apparatus is in motion during a presentation, or exhibition of said films.

Another object is to furnish a novel and compact form of motion picture projector wherein separated sound and action record films may be readily inserted for the presentation thereof, said films being substantially hermetically, or fire proofingly enclosed, suitable doors permitting ready inspection and insertion thereof for the threading said films therein.

Another object is to furnish a novel form of duplex film magazine for attachment to a motion picture projector whereby both the exhibited sound and action films may be wound onto reels in separated compartments, said reels being driven from a single driving mechanism.

Another object is to furnish a novel form of motion picture projector mounting which will permit loading of sound record film on one side of the projector and action records on the other side independently of the angle at which the projected beam of light may leave the projection room in which the projector may be allocated.

Other objects and advantages will appear as the description of the invention progresses, and the novel feature of the invention will be pointed out in the appended claims.

This invention consists in the novel construction and arrangement of parts hereinafter described, delineated in the accompanying drawings, and particularly pointed out in that portion of this instrument wherein patentable novelty is claimed for certain and peculiar features of the apparatus, it being understood that, within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawings, wherein I have illustrated embodiments of my invention, and, wherein like characters of reference, designate corresponding parts throughout the several views, and in which:—

Fig. 1 is a fragmental part sectional part plan view of one embodiment of the invention taken on line 1—1 of Fig. 2, and Fig. 2 is a sectional view of the same taken on line 2—2 of Fig. 1, and Fig. 3 is a reduced size plan view of a projector to which applicant's invention has been applied, taken on line 3—3 of Fig. 4, and Fig. 4 is another plan view of the same taken on line 4—4 of Fig. 3, and Fig. 5 is a fragmental plan view of a projector to which a modified form of the invention has been applied taken on line 5—5 of Fig. 6, the door being removed, and Fig. 6 is a part plan part sectional view of the same taken on line 6—6 of Fig. 5, and Fig. 7 is still another similar modification taken on line 7—7 of Fig. 8, and Fig. 8 is a part plan part sectional view of the same taken on line 8—8 of Fig. 7.

Referring to Figures 1, 2, 3 and 4, projector 1 comprises in part frame or base 2, to which is hinged by pin 3 the lamp bed 4, rigidly secured to housing 9 and arranged to be raised and lowered by screw 5 passing through nut 6 pivoted to said frame, said bed supporting lamp house 7 arranged to project a beam of light through action film chamber 8 of film advancing housing 9, secured to said bed, said housing also having a sound film chamber 10 adjacent said action film chamber.

Secured to the top of film advancing housing 9 is duplex magazine 12 having hinged thereto on one side thereof door 13 for inserting action film reel 14, and on the other side door 15 for inserting sound film reel 16.

Secured to the bottom of film advancing housing 9 is another duplex magazine 17 having door 18 on one side thereof for inserting action film take up reel 19, and door 20 on the opposite side for inserting sound film take up reel 21. The take up reels 19 and 21 are supported on a common shaft 22, revolving in bearing 31 formed in wall 32, said shaft supporting pulley 23 driven by belt 24.

Projector 1 is supplied with a suitable shutter 103 and is arranged to project motion pictures on screen 27 simultaneously with supplying accompanying sound from one or more loud speakers, as 28, cable 29 extending between said speakers and light valve unit 30, suitable known translating and amplifying devices (not shown) being interposed therebetween.

Referring more particularly to Figures 1 and 2, the action film advancement chamber 8 is assumed to support suitably driven mechanism for intermittently advancing an action motion picture film as 35, and suitable connection to said mechanism is made whereby shaft 36 is rotated in a manner more fully described hereinafter.

Action film advancing chamber 8 of housing 9 is accessible through hinged door 37 (Fig. 4) whereby action record film 35 may be threaded over the sprocket and through a film gate therein in known manner.

Sound film advancing chamber 10 is also accessible through a hinged door 38 thereby permitting threading of sound record film 39 through light valve unit 30 and over sprocket 40 and thence to take up reel 21.

Shaft 36 rotates in bearing 41 formed in housing 9 and is restrained from axial movement by collar 42 secured thereto on side of said bearing, and by flanged collar 43 also secured to said shaft on the opposite side of said bearing.

Axially movable on shaft 36 but restrained from rotation thereon by key 44 operating in keyway 45, is screw sleeve member 46 having male threads 47 arranged to mesh with similar female threads 48 formed in hub 49 of sprocket 40.

Screw 46 is also formed with a grooved portion 50 rotatably supporting collar 51 having lugs 52—52 arranged to enter bifurcated end 53 of lever 54 pivoted on one end of links 55 by pin 56, the other end of said links being pivoted on boss 57 by pin 58. To the upper bifurcated end 59 of lever 54, is pivotally secured orificed member 60, in the orifice of which is rotatably supported screw 61, collars 62—62 secured to said screw acting to restrain axial movement thereof in said orificed member. Screw 61 is supplied with a suitable knob 63 for the rotation in and out thereof in threaded boss 64 formed in housing 9.

Adjustably secured to hub 49 of sprocket 40, is combined stop collar and pulley member 65, having threaded tubular portion 66, stop flange portion 67 and pulley portion 68 arranged to drive belt 24.

Referring to Figures 1, 2, 3 and 4, projection machine 1 is assumed to be installed in a projection room of a motion picture theatre or similar place of amusement, or educational institution, and when an exhibition of a "talking movie" is to be presented from separated sound and action films, the doors 13, 18 and 37 are opened on the action film side of said projector and the action film reel 16 having action film 33 thereon to be exhibited, is inserted in the upper action side of magazine unit 12 as shown in Figures 3 and 4, whereafter the end of said film is threaded through the mechanism in action film advancing chamber 8 and thence onto action take up reel 21 in the action reel chamber of lower magazine unit 17, whereafter said doors are closed.

Following the aforesaid operation, doors 15, 20 and 38 of the sound film side of said projector are opened by handles 25—25 and the reel 16 having sound film 39 thereon to be exhibited is inserted into the sound film reel chamber of upper magazine 12, whereafter the end thereof is threaded through light valve unit 30, over sprocket 40 and onto take up reel 21 in the sound reel chamber of lower magazine 17.

When the exhibition is to begin "framing" of the action film 35 is made in known manner by "framing" lever 70, (Fig. 3) and whereas said films are assumed to have been threaded in accordance with certain indicating marks thereon for purpose of synchronization, conditions forming variable factors fundamental to differing theaters or buildings in which said exhibitions are made, or differing sound amplifying or transmitting devices may affect said synchronization thereby also requiring a "framing" of the sound record film 39 with the action film 35. Such framing is accomplished by the rotation of screw 61 by handle 63, a clockwise rotation of, or inward movement of, said screw acting to withdraw threaded sleeve 46 from hub 49 causing sprocket 40 to rotate clockwise, thereby advancing film 39 with respect to film 35, and a reverse movement of said screw acting to insert said sleeve into said hub and whereby a rotation of said sprocket in a reverse direction is effected, thereby causing film 39 to be rearwardly positioned with respect to film 35. In other words, if the reproduced sound record on film 39 is found to be leading, namely, is being produced in advance of the action picture exhibited by film 35, sprocket 40 is rotated counter-clockwise by similarly rotating "framing" screw 61, and if said reproduced sound is found to be "lagging", or is produced after the action picture is presented, the sprocket is caused to rotate clockwise by rotating said framing screw in a similar direction.

It is to be noted that the aforesaid framing of the sound record film 39 is accomplished without interruption of the movement of said film while the exhibition thereof, as well as the exhibition of action record film 35, is in progress.

A motor 33 secured to frame 2 is arranged to drive the mechanism of projector 1.

Sprocket 40 is preferably of a diameter, and threads 47 and 48 are preferably of a pitch, whereby a complete in or out movement of screw 46 will advance sound record film 39 approximately 2 feet or 32 frames whereby a plurality of sections may be removed from one reel of action film, as 35, and said sound record film may be quickly framed to compensate for the said removed sections, or "patches" may be made during the exhibition of said film, as for example, if for any reason the action film becomes damaged during projection of said films, whereby a renewal of a number of frames may be required.

Referring to Figures 5 and 6 showing a modification of applicant's invention, projector 1 has been modified to include a modified film advancing housing 75, supporting duplex feed reel magazine 12 at the top thereof, and duplex take up reel magazine 17 at the bottom thereof, said modified housing comprising sound record film advancing and framing chamber 76, sealed by door 77, and action record film advancing chamber 78, sealed by door 79, said last named chamber supporting suitable film advancing mechanism as heretofore described, arranged to rotate shaft 80 operating in bearing 81 and supporting sprocket wheel 82 arranged to advance sound record film 39, rollers 83—83 acting to restrain said film against the periphery of said sprocket wheel.

Rotatably supported in bearings 84—84 formed in housing 75 is threaded rod, or framing member 85, supporting bevel gear 86 meshing with a similar gear 87 secured to shaft 88 rotating in bearing 89, said shaft having a suitable crank 90 for rotation thereof.

Also supported in bosses 91—91 formed in housing 75, is guide rod 92, said rod and framing screw 85 being arranged to slidably support light valve unit 93, said unit supporting a threaded sector 94, the threads of which are arranged to be restrained against the threads of framing screw 85 by spring 95, a suitable handle 96, extending through slot 97 in housing 75, when moved to the right, being arranged to release sector 94 from said framing screw whereby said light valve unit may be more rapidly raised and lowered for framing the sound record of film 39 with respect to the action record of film 35 more rapidly while projector 1 is in operation.

Light valve unit 93, in known manner, is assumed to effect reproduction of the sound, photographically, or otherwise impressed on sound record film 39, conductor cable 98 restrained taut by weight pulley 99, acting to supply energy thereto and therefrom through outlet, or coupling plug number 100.

Referring to the operation of Figs. 5 and 6, normally light valve unit 93 is preferably positioned on rods 93 and 85 at the location shown by the full lines and sound record film 39 is threaded therethrough from reel 14, over sprocket 82 and onto take up reel 19. When the projector is placed in operation, if the reproduced sound is found to be leading the exhibition of the action, said unit is moved downwardly by rotation of crank 90, and if said sound is found to be lagging, said unit is moved upwardly by reverse rotation of said crank. If said reproduced sound is found to be abnormally leading or lagging, the handle 96 may be withdrawn, thereby removing sector 94 from engagement with framing screw 85 and unit 93 may be more rapidly and more extensively moved up or down to properly frame said reproduced sound with the reproduced action exhibited by film 35.

Referring to Figures 7 and 8, showing another modification of applicant's invention, the projector 1 has been modified in form to include a film advancing housing 105 similar to housing 75 in that action record film chamber 78 supports similar action film advancing mechanism arranged to drive a shaft 80 supporting a sprocket wheel 82 for advancing sound record film 39.

Sound record film advancing and framing chamber 106 of housing 105, however, is modified to include a threaded framing rod or screw 107 rotatably supported in bearing bosses 108—108, formed in housing 105, said rod supporting bevel gear 109, meshing with a similar gear 110 supported on shaft 111, rotated by crank 112 positioned exteriorly of said housing. Also rigidly supported by and between bosses 108—108 is guide rod 113, said rod and framing screw 107 acting to guide film spool bracket 114 supporting film spool 115 rotating on shaft 116 secured to said bracket, said framing screw, by rotation thereof in threaded boss 117, also acting to raise and lower said bracket on said rod and screw, as crank 112 is rotated.

Light valve unit 120 is rigidly secured to housing 105 adjacent the top wall thereof.

Film guide spools 121—121 are rotatably supported in magazine 12 and a similar spool 122 is rotatably supported on stud 123 secured in boss 124 formed in housing 105. Also rotatably supported by shaft 125 secured to housing 105 is film guide spool 126.

Referring to the operation of Figs. 7 and 8, assuming action record film 35 has been threaded through action film advancing chamber 78 of housing 105, and the co-related sound record film 39 on reel 14 has been inserted in its respective chamber in magazine 12, the end thereof is threaded between spools 121—121, thence through light valve 120, thence around film spool 115, upwardly and over spool 126, thence downwardly and around spool 122, thence between driving sprocket 82 and spools 83—83, and thence into magazine 17 onto the sound record film take up spool 19.

When placing the projector in operation the framing spool bracket 114 is preferably positioned as shown by the full lines, and, if when said projector is placed in operation, it is found the reproduced sound furnished by sound record film 39 is leading the reproduced action, crank 112 is rotated to cause said bracket and spool 115 to move upwardly whereby the movement of said sound record film is retarded temporarily with respect to the movement of the action film 35, whereas if said reproduced sound is found to be lagging, said crank is reversely rotated whereby said bracket and spool are lowered in this manner temporarily causing the sound record film to move more rapidly than the action record film.

What I claim is:—

1. Sound motion picture projection apparatus arranged to advance synchronously recorded separated photographic sound and action record films for producing exhibition of sound motion pictures which comprises, means supported by the apparatus for advancing the action record film through a path of instrumentalities whereby the exhibition of the action record thereon will be effected as the film is advanced relatively thereto, means supported by the apparatus for advancing the sound record film through another path of instrumentalities positioned remotely from the first named path whereby the exhibition of the sound recorded thereon will be effected as the film is advanced therethrough, and means operable independently of the sound film advancing means for advancing or retarding the movement of the exhibited portion of the sound film whereby mal-synchronizing of the exhibited records may be synchronized during the advancement of the films by the apparatus.

2. Sound motion picture projection apparatus arranged to advance synchronously recorded separated photographic sound and action record films for producing exhibition of sound motion pictures which comprises, means supported by the apparatus for intermittently advancing the action record film through a path of instrumentalities whereby the exhibition of the action record thereon will be effected as the film is advanced relatively thereto, means supported by the apparatus for continuously advancing the sound record film through another path of instrumentalities positioned remotely from the first named path whereby the exhibition of the sound recorded thereon will be effected as the film is advanced therethrough, and means operable independently of the sound film advancing means for advancing or retarding the movement of the exhibited portion of the sound film whereby mal-synchronizing of the exhibited records may be synchronized during the advancement of the films by the apparatus.

3. Sound motion picture exhibition apparatus for advancing synchronously recorded separated sound and action films which comprises, a film advancing unit, means for adjustably supporting the unit, a fire-proofed dual chamber housing supported thereby having a sound film advancing mechanism supported in one chamber and an action film advancing mechanism supported in the other chamber, the mechanisms being arranged to advance the films through correlated light beams for producing exhibition of the records formed thereon, synchronizing mechanism supported within the sound mechanism chamber arranged to advance or retard the movement of the exhibited portion of the sound film independently of the advancement thereof by the film advancing mechanism, and means operated at will positioned exteriorly of the housing for effecting operation of the synchronizing mechanism whereby mal-synchronizing of the exhibited records may be synchronized as the films are advanced by the apparatus.

4. Sound motion picture exhibition apparatus for advancing synchronously recorded sound and action film which comprises, film advancing mechanism supported by the apparatus for advancing the action record on the film through a fixed light beam for effecting exhibition of the action recorded thereon, a light slit unit arranged to direct a light beam onto a light sensitive cell, film advancing mechanism supported by the apparatus for advancing the sound record on the film relatively to the slit of the unit for effecting exhibition of the sound recorded thereon, the sound record advancing mechanism being driven in synchronism with the action record advancing mechanism, and means for adjustably positioning the light slit unit relatively to the direction of travel of the sound record on the film whereby the exhibited portion thereof may be varied with respect to the exhibited portion of the action record independently of the advancement of the exhibited portion of the sound record effected by the sound record advancing mechanism.

5. Sound motion picture exhibition apparatus for advancing synchronously recorded separated sound and action record films which comprises, film advancing mechanism supported by the apparatus for advancing the action record film through a fixed light beam for effecting the exhibition of the action recorded thereon, a light slit unit arranged to direct a light beam onto a light sensitive cell, film advancing mechanism for advancing the sound film through the unit relatively to the light slit thereof for effecting exhibition of the sound recorded thereon, the sound film advancing mechanism being driven in synchronism with the action film advancing mechanism, and means for adjustably positioning the unit relatively to the direction of travel of the sound record film whereby the exhibited portion of the film may be varied with respect to the exhibited portion of the action film independently of the advancement of the exhibited portion of the sound record film effected by the sound film advancing mechanism.

6. In sound motion picture apparatus for exhibiting independent sound and picture films, a film advancing housing having a sound film mechanism chamber and a picture film mechanism chamber, each chamber having oppositely facing openings for access to the mechanism therein, openable cover members normally closing the openings, and film advancing mechanism in each chamber for advancing the films, the mechanism in one chamber being operatively connected to the mechanism in the other chamber for effecting synchronous advancement of the films.

7. In sound motion picture apparatus for exhibiting independent sound and picture films, a normally fixed base, a film advancing housing pivoted thereto having independent sound and picture film advancing chambers each chamber having oppositely facing openings for access to the mechanism therein, openable cover members normally closing the openings, mechanism in the sound film chamber for advancing the sound film therethrough for effecting reproduction of the recorded sound, mechanism in the picture film chamber for advancing the picture film therethrough for effecting exhibition of the motion pictures thereon, the mechanisms being operatively connected for advancing the films synchronously.

8. In sound motion picture apparatus for exhibiting independent sound and picture films, a film reel housing having independent sound and picture film reel chambers, the chambers having oppositely facing openings for inserting the reels thereinto, openable cover members normally closing the openings, a reel supporting member rotatively supported by the housing having reel supporting extensions extending into each chamber, and means for rotating the reel supporting member.

9. In sound motion picture apparatus for exhibiting independent sound and picture films, a film reel housing having independent sound and picture film reel chambers, the chambers having oppositely facing openings for inserting the reels thereinto, openable cover members normally closing the openings, and a reel supporting member supported by the wall portion of the housing forming the separation between the chambers, the supporting member having oppositely facing shaft portions for supporting the sound and picture film reels in their respective chambers.

10. In sound motion picture apparatus for exhibiting independent sound and picture films, a plurality of film reel housings having independent sound and picture film reel chambers, each chamber having an opening through which the reels are inserted thereinto, openable cover members normally closing the openings, clamping faces formed on the reel housings, a film advancing housing having independent sound and picture film chambers including mechanism for advancing the films synchronously, and clamping faces on the film advancing housing arranged to clampably engage the clamping faces of the reel housings for the support thereof.

11. In sound motion picture apparatus for exhibiting independent sound and picture films, a plurality of film reel housings having independent sound and picture film reel chambers, each chamber having an opening through which the reels are inserted thereinto, openable cover members normally closing the openings, clamping faces on the reel housings formed in a plane disposed angularly to the plane of the openings, a film advancing housing having independent sound and picture film chambers including mechanism for advancing the films synchronously, and clamping faces on the film advancing housing arranged to clampably engage the clamping faces of the reel housings.

12. In sound motion picture apparatus for exhibiting sound film, a fixed sound reproducing unit through which the film is advanced, the unit including a light source for directing light through the film onto a light sensitive cell, a sprocket arranged to advance the film through the unit, means for normally rotating the sprocket at a constant speed for advancing the film at a uniform normal rate of travel, and synchronizing means for rotating the sprocket and the sprocket rotating means relatively during the rotation thereof for periodically advancing the film at a greater or lesser rate of travel than normal.

13. In sound motion picture apparatus for exhibiting independent sound and picture films, a film feed reel housing having independent sound and picture feed reel chambers, the housing having a clamping face for the support thereof, a film take-up reel housing having independent sound and picture film take-up reel chambers, the housing having a clamping face for the support thereof, a film advancing housing having independent sound and picture chambers including mechanism for advancing the films synchronously, and spaced clamping faces on the film advancing housing arranged to engage the clamping faces of the reel housings.

14. In sound motion picture apparatus for exhibiting independent sound and picture films, a film advancing housing, independent sound and picture film chambers, means for advancing the picture film in the picture film chamber for effecting exhibition of the recorded pictures, means for advancing the sound film in the sound film chamber for effecting reproduction of the recorded sound for accompaniment to the exhibited pictures, the film advancing means being arranged to normally advance the sound and picture films at synchronous rates of travel, and synchronizing means affecting the film advancing means for periodically advancing or retarding the rate of travel of the film in one chamber relatively to the rate of travel of the film advancement in the other chamber for synchronizing the exhibited pictures and reproduced sound.

15. In sound motion picture apparatus for exhibiting independent sound and picture films, a source of light arranged to be projected onto a motion picture screen, another source of light directed onto a light sensitive cell, mechanism for advancing the picture film through the first named light source for effecting exhibition of the pictures, mechanism for advancing the sound film through the second named light source for effecting reproduction of sound to the accompaniment of the exhibited pictures, the mechanisms being arranged to normally advance the sound and picture films at synchronous rates of travel, and means for periodically advancing or retarding the light exposed portion of one of the films at a rate of travel differing from the rate of travel of the light exposed portion of the other film for synchronizing the exhibited pictures with the reproduced sound.

16. In sound motion picture apparatus for exhibiting independent sound and picture films, a source of light arranged to be projected onto a motion picture screen, another source of light directed onto a light sensitive cell, mechanism for advancing the picture film through the first named light source for effecting exhibition of the pictures, mechanism for advancing the sound film through the second light source for effecting reproduction of sound to the accompaniment of the exhibited pictures, the mechanisms being arranged to normally advance the sound and picture films at synchronous rates of travel, and means for periodically advancing or retarding the light exposed portion of the sound film at a rate of travel differing from the normal rate of travel of the light exposed portion of the picture film for synchronizing the exhibited pictures with the reproduced sound.

17. In sound motion picture apparatus for exhibiting independent sound and picture films, a source of light arranged to be projected onto a motion picture screen, a second light source directed onto a light sensitive cell, mechanism for advancing the picture film through the first named light source for effecting exhibition of the pictures, mechanism for advancing the sound film through the second named light source for effecting reproduction of sound to the accompaniment of the exhibited pictures, the mechanisms being arranged to normally advance the sound and picture films at synchronous rates of travel, and means for periodically moving the second named light source and correlated light cell in a plane parallel to the plane of movement of the sound film during the normal advancement thereof for synchronizing the exhibited pictures and reproduced sound.

18. In sound motion picture apparatus for exhibiting independent sound and picture films, a film mechanism housing having independent sound film and picture film chambers, an actuating member rotatively supported by the housing having a portion extending into the picture film chamber for effecting advancement of the picture film and another portion extending into the sound film chamber for effecting advancement of the sound film, a film sprocket rotatively supported by the portion extending into the sound film chamber arranged to normally rotate synchronously therewith, and means for effecting relative rotation of the sprocket and the portion upon which it is rotatively supported.

19. In sound motion picture apparatus for exhibiting independent sound and picture films, a normally fixed base, a film mechanism housing pivotally supported thereby, the housing having independent sound and picture film advancing chambers, means for positioning the housing at predetermined and fixed pivoted positions with respect to the base, means associated with the picture film chamber for effecting exhibition of pictures as the picture film is advanced therethrough, means associated with the sound film chamber for effecting reproduction of sound as the sound film is advanced therethrough, mechanism for advancing the picture film through the picture film chamber, mechanism for advancing the sound film through the sound film chamber, the mechanisms being arranged to normally advance the films synchronously, and means for periodically advancing or retarding that portion of the sound film reproducing sound at a rate of travel differing from the rate of travel of the portion of the picture film effecting exhibition of the pictures for synchronizing the exhibited pictures with the reproduced sound.

20. In sound motion picture apparatus for exhibiting independent sound and picture films, means for projecting the pictures on the picture film including means for advancing the film at a normal uniform rate of travel, means for reproducing the sound on the sound film including means for advancing the film at a normal uniform rate of travel, the projected portion of the picture film and the sound reproducing portion of the sound film being normally synchronously advanced, and means for periodically advancing the sound reproducing portion of the sound film at a greater or lesser rate of travel than the normal rate of travel thereof.

21. In sound motion picture apparatus for exhibiting independent sound and picture films, an optical system including a light source directed onto a light sensitive cell, means for normally moving the sound film and the optical system relatively at a uniform rate of travel for effecting reproduction of sound, a second optical system including a light source arranged to be directed onto a motion picture screen, means for normally moving the picture film and the second named light source relatively for effecting exhibition of motion pictures to the accompaniment of the reproduced sound, the normal relative movement of the sound film and its correlated optical system and the normal relative movement of the picture film and its correlated optical system being synchronous, and means for periodically moving the sound film and its correlated optical system relatively at a greater or lesser rate of travel than the normal relative rate of travel thereof for effecting synchronizing of the exhibited pictures and reproduced sound.

22. In sound motion picture apparatus for exhibiting independent sound and picture films, a film feed reel housing having independent sound and picture film reel chambers, the housing having a clamping face for the support thereof, a film take-up reel housing having independent sound and picture take-up reel chambers, the housing having a clamping face for the support thereof, a film advancing housing having independent sound and picture film mechanism chambers, the housing having spaced clamping faces arranged to engage the clamping faces of the reel housings, passageways connecting the sound film reel and sound mechanism chambers for advancing the sound film therethrough, and passageways connecting the picture film reel and picture mechanism chambers, the sound film passageways being independent of the picture film passageways.

OSCAR A. ROSS.